United States Patent [19]
Dorschner et al.

[11] 3,871,863
[45] Mar. 18, 1975

[54] PHYTOCIDAL COMPOSITIONS CONTAINING N-HETEROCYLIC ETHERS

[75] Inventors: Kenneth P. Dorschner, Jackson; Carl Bordenca, Ponte Vedra, both of Fla.

[73] Assignee: SCM Corporation, Cleveland, Ohio

[22] Filed: May 31, 1972

[21] Appl. No.: 258,315

Related U.S. Application Data

[63] Continuation of Ser. No. 8,094, Feb. 2, 1970, abandoned.

[52] U.S. Cl. ............................ 71/88, 71/94, 71/95
[51] Int. Cl. ............................................. A01n 9/00
[58] Field of Search ........................... 71/88, 94, 95

[56] References Cited
UNITED STATES PATENTS

| | | | |
|---|---|---|---|
| 3,397,053 | 8/1968 | Bordenca et al. | 71/98 |
| 3,472,845 | 10/1969 | Thiele | 260/584 C |
| 3,703,554 | 11/1972 | Bordenca | 71/121 X |
| 3,776,714 | 12/1973 | Bordenca | 71/98 |

*Primary Examiner*—James O. Thomas, Jr
*Attorney, Agent, or Firm*—A. Joseph Gibbons; Merton H. Douthitt

[57] ABSTRACT

Novel compositions comprising (a) an inert carrier and (b) a phytocidal quantity of a compound of the formula:

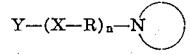

where
Y is a monovalent hydrocarbon radical containing from 8 to 12 carbon atoms,
X is sulfur or oxygen,
R is lower alkylene,

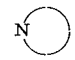

represents a nitrogen-containing heterocyclic group, and
n is an integer of from 1 to 3, are described. The invention is advantageous in that the compositions exhibit phytocidal properties toward a wide spectrum of plants. Crop plants are not adversely affected by a significant number of the compositions of this invention, which are selective against pest weeds. Other compositions are general phytocides and are useful in controlling plant growth in rights-of-way.

6 Claims, No Drawings

PHYTOCIDAL COMPOSITIONS CONTAINING N-HETEROCYLIC ETHERS

This is a continuation of application Ser. No. 8,094, filed Feb. 2, 1970 and now abandoned.

BACKGROUND OF THE INVENTION

This invention pertains to novel compositions and more particularly to novel compositions containing N-heterocyclic compounds which are effective phytocides.

The closest prior art known to applicant is U.S. Pat. No. 3,472,845 "Terpenyl Amino Alkyl Ethers and Thioethers," issued Oct. 14, 1969 to Thiele, which discloses related compounds for treating inflammation occurring in bodies of mammals.

SUMMARY OF THE INVENTION

The present invention relates to a novel class of phytocidal compositions. The term "phytocidal compositions" as used herein is intended to mean and to refer to compositions which have general phytocidal or herbicidal activity and to selective phytocidal compositions which kill or prevent the growth of pest weeds without substantially affecting the growth of valuable crops.

When used in sufficient concentrations, certain compositions falling within the scope of this invention are general herbicides capable of killing plants or controlling their growth and are valuable in protecting public utility lines, railroad and highway rights-of-way from overgrowth by plants and weeds.

Certain other compositions falling within the scope of this invention are selectively effective in eliminating a wide spectrum of undesirable plants such as, for example, mustard, yellow foxtail, barnyard grass, pigweed, crabgrass, millet, buckwheat, coffeeweed, morning glory, and the like when used pre-emergently or post-emergently in selective phytocidal concentrations without adversely affecting the growth of valuable crop plants.

The invention provides novel compositions comprising (a) an inert carrier and (b) a phytocidal quantity of a compound having the formula:

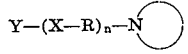     I where Y is a monovalent hydrocarbon radical containing from 8 to 12 carbon atoms,
X is sulfur or oxygen,
R is lower alkylene,

represents a nitrogen-containing heterocyclic group, and
n is an integer of from 1 to 3.

Compositions falling within the scope of Formula I, when used to contact a plant environment, effectively remove the undesirable plants therefrom selectively or completely, depending upon the particular compositions employed.

The term "plant environment" as used herein is intended to mean and to include areas or surfaces which are capable of supporting plant life and surfaces of pest weeds and crop plants.

DESCRIPTION OF ADVANTAGEOUS EMBODIMENTS

Compounds falling within the scope of Formula I usually have limited water solubility, but are generally soluble or dispersible in conventional liquids, solids or semi-solids employed in phytocidal or herbicidal formulations. The compounds are usually liquids, have the general properties of oils and boil between 100°C. and 170°C., the boiling points being measured at 1 mm of mercury.

The compositions of this invention are relatively nontoxic in concentrations or amounts above those which are phytocidally effective.

In compounds falling within the scope of Formula I,

represents a saturated or unsaturated heterocyclic group containing at least one nitrogen atom. Saturated heterocyclic groups represented by

include ethylenimino, azetidino, pyrrolidino, piperidino, piperazino and morpholino. Unsaturated heterocyclic groups represented by

included pyrrolo, pyrrollino, pyrazollo and imidazollo.

The N-heterocyclic groups or radicals which form one distinct part of the compounds falling within the scope of Formula I are discussed in an American Chemical Society Monograph entitled "Industrial Organic Nitrogen Compounds," by Melvin J. Astle, pages 115-179, published by Reinhold Publishing Corporation, New York, 1961. Particularly advantageous compounds are those which contain saturated heterocyclic groups selected from the class consisting of pyrrolidino, piperidino and morpholino.

In compounds covered by Formula I, Y represents a monovalent hydrocarbon group or radical and can be a terpenyl or terpenyl-derived hydrocarbon. The term "terpenyl-derived hydrocarbon" as used herein is intended to mean and to refer to cyclic or acyclic hydrocarbons which are not terpene radicals but which are derived from terpenes. When Y represents terpenyl, Y can be acyclic, monocyclic or bicyclic terpenyl.

Acyclic terpenyl groups which can be represented by Y include, for example, citronellyl, bupleuryl, geranyl, neryl, lavandulyl, linalyl and myrcenyl.

Monocyclic terpenyls which can be represented by Y include methyl, tetrahydrocarvyl, alpha-terpinyl, beta-terpinyl and gamma-terpinyl, the terpinenyls, dihydrocarvyl, piperityl, isopulegyl, carvyl, etc.

Bicyclic terpenyl groups which Y can represent include nopyl, sabinyl, thujyl, pinocamphanyl, myrtenyl, verbenyl, caranyl, pinocarvyl, the santenyls, bornyl, isobornyl, fenchyl, isofenchyl and the like.

Compounds covered by Formula I where Y represents a terpenyl-derived hydrocarbon include, for example, substituted and unsubstituted saturated and substituted and unsubstituted unsaturated aliphatic and cyclo-aliphatic groups containing from 8 to 12 carbon atoms and preferably containing 10 carbon atoms.

Saturated acyclic aliphatic groups or radicals which can be represented by Y include octyl, nonyl, decyl, undecyl, dodecyl groups or radicals and halo-, nitro-, amino-, and lower alkyl-substituted derivatives of these acyclic aliphatic groups. Of these groups, compounds wherein Y is 3,7-dimethyloctyl have been found to be particularly advantageous.

Saturated cyclo-aliphatic groups or radicals which Y can represent include cyclo-octyl groups or radicals and the halo-, nitro-, amino- and lower alkyl-substituted derivatives of these cyclo-aliphatic groups.

Examples of unsaturated cyclo-aliphatic groups or radicals which Y can represent include cyclo-octenyl, cyclo-dodecenyl, etc., and halo-, nitro-, amino- and lower alkyl-substituted derivatives of these unsaturated cyclo-aliphatic groups.

In compounds covered by Formula I, R represents a lower alkylene, containing 2–6 carbon atoms (e.g. ethylene, propylene, butylene, pentylene, or hexylene) and is preferably ethylene for economic reasons. However, where $n$ is greater than 1, R can represent like or dissimilar lower alkylenes.

An advantageous class of compounds falling within the scope of Formula I which has been found to possess a high degree of phytocidal activity is represented by the formulae:

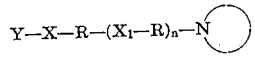 II where Y, X, R, and

are as hereinbefore described,
$X_1$ is sulfur or oxygen,
$n$ is an integer of 1 or 2, and
when X is sulfur the group $(X_1-R)_n$ contains at least one oxygen atom.

Subclasses of phytocidally advantageous compounds falling within the scope of Formula II include compounds of the formulae:

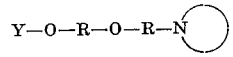 II-A

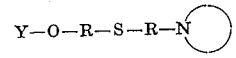 II-B

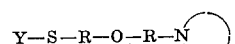 II-C

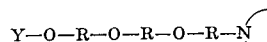 II-D

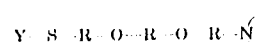 II-E where in the Formulae II-A, II-B, II-C, II-D, and II-E, Y, R and

are as hereinbefore described.

In compounds falling within the scope of the foregoing Formulae, R is a lower alkylene group which can contain from one to six carbon atoms, but preferably contains from one to four carbon atoms since compounds in which the lower alkylene groups contain 5 or more carbon atoms often tend to be insoluble or to have low dispersibility in aqueous liquids in which they are sometimes employed. Although R can be ethylene, propylene, or butylene, particularly advantageous economical compounds are those wherein R represents ethylene.

Another advantageous subclass of compounds falling within the scope of Formula I includes compounds of the formula:

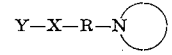 III where Y, X, R, and

are as hereinbefore described.

Compositions containing specific compounds falling within the scope of Formulae II, II-A through II-E and III which have been found to have an especially high degree of phytocidal activity include, for example, the following compounds:

2-N-morpholinoethoxyethyl carvyl ether
2-N-morpholinoethoxyethyl carvyl thioether
2-N-morpholinoethoxyethyl terpinyl thioether
2-N-morpholinoethoxyethyl terpinyl ether
2-N-morpholinoethoxyethyl geranyl ether
2-N-morpholinoethoxyethyl geranyl thioether
2-N-morpholinoethoxyethyl linalyl thioether
2-N-morpholinoethoxyethyl linalyl ether
2-N-morpholinoethoxyethyl isobornyl ether
2-N-morpholinoethoxyethyl isobornyl thioether
2-N-morpholinoethoxyethyl pinocarvyl thioether
2-N-morpholinoethoxyethyl pinocarvyl ether
2-N-morpholinoethoxyethyl 3,7-dimethyloctyl thioether
2-N-morpholinoethoxyethyl 3,7-dimethyloctyl ether
2-N-piperidinoethoxyethyl carvyl ether
2-N-piperidinoethoxyethyl carvyl thioether
2-N-piperidinoethoxyethyl terpinyl thioether
2-N-piperidinoethoxyethyl terpinyl ether
2-N-piperidinoethoxyethyl geranyl ether
2-N-piperidinoethoxyethyl geranyl thioether
2-N-piperidinoethoxyethyl linalyl thioether
2-N-piperidinoethoxyethyl linalyl ether
2-N-piperidinoethoxyethyl isobornyl ether
2-N-piperidinoethoxyethyl isobornyl thioether
2-N-piperidinoethoxyethyl pinocarvyl thioether
2-N-piperidinoethoxyethyl pinocarvyl ether
2-N-piperidinoethoxyethyl 3,7-dimethyloctyl thioether
2-N-piperidinoethoxyethyl 3,7-dimethyloctyl ether
2-N-pyrrolidinoethoxyethyl carvyl ether
2-N-pyrrolidinoethoxyethyl carvyl thioether
2-N-pyrrolidinoethoxyethyl terpinyl thioether 2-N-pyrrolidinoethoxyethyl terpinyl ether
2-N-pyrrolidinoethoxyethyl geranyl ether
2-N-pyrrolidinoethoxyethyl geranyl thioether
2-N-pyrrolidinoethoxyethyl linalyl thioether
2-N-pyrrolidinoethoxyethyl linalyl ether
2-N-pyrrolidinoethoxyethyl isobornyl ether
2-N-pyrrolidinoethoxyethyl isobornyl thioether
2-N-pyrrolidinoethoxyethyl pinocarvyl thioether
2-N-pyrrolidinoethoxyethyl pinocarvyl ether
2-N-pyrrolidinoethoxyethyl 3,7-dimethyloctyl thioether
2-N-pyrrolidinoethoxyethyl 3,7-dimethyloctyl ether
2-N-morpholinoethyl carvyl ether
2-N-morpholinoethyl carvyl thioether
2-N-morpholinoethyl terpinyl thioether
2-N-morpholinoethyl terpinyl ether
2-N-morpholinoethyl geranyl thioether
2-N-morpholinoethyl geranyl ether
2-N-morpholinoethyl linalyl thioether
2-N-morpholinoethyl linalyl ether
2-N-morpholinoethyl isobornyl thioether
2-N-morpholinoethyl isobornyl ether
2-N-morpholinoethyl pinocarvyl thioether
2-N-morpholinoethyl pinocarvyl ether
2-N-morpholinoethyl 3,7-dimethyloctyl thioether
2-N-morpholinoethyl 3,7-dimethyloctyl ether
2-N-piperidinoethyl carvyl ether
2-N-piperidinoethyl carvyl thioether
2-N-piperidinoethyl terpinyl thioether
2-N-piperidinoethyl terpinyl ether
2-N-piperidinoethyl geranyl ether
2-N-piperidinoethyl geranyl thioether
2-N-piperidinoethyl linalyl thioether
2-N-piperidinoethyl linalyl ether
2-N-piperidinoethyl isobornyl ether
2-N-piperidinoethyl isobornyl thioether
2-N-piperidinoethyl pinocarvyl thioether
2-N-piperidinoethyl pinocarvyl ether
2-N-piperidinoethyl 3,7-dimethyloctyl thioether
2-N-piperidinoethyl 3,7-dimethyloctyl ether
2-N-pyrrolidinoethyl carvyl ether
2-N-pyrrolidinoethyl carvyl thioether
2-N-pyrrolidinoethyl terpinyl thioether
2-N-pyrrolidinoethyl terpinyl ether
2-N-pyrrolidinoethyl geranyl ether
2-N-pyrrolidinoethyl geranyl thioether
2-N-pyrrolidinoethyl linalyl ether
2-N-pyrrolidinoethyl linalyl thioether
2-N-pyrrolidinoethyl isobornyl ether
2-N-pyrrolidinoethyl isobornyl thioether
2-N-pyrrolidinoethyl pinocarvyl thioether
2-N-pyrrolidinoethyl pinocarvyl ether
2-N-pyrrolidinoethyl 3,7-dimethyloctyl ether
2-N-pyrrolidinoethyl 3,7-dimethyloctyl thioether Compositions containing the methoxy, propoxy, and butoxy analogs and the methyl, propyl and butyl analogs of the foregoing have also been found to possess a high degree of phytocidal activity.

Compositions containing specific compounds falling within the scope of Formulae II, II-A though II-E and III which have been found to have selective phytocidal activity against pest weeds without substantially affecting the crop plants include, for example, the following compounds:

2-N-morpholinoethoxyethyl carvyl ether
2-N-morpholinoethoxyethyl carvyl thioether
2-N-morpholinoethoxyethyl isobornyl ether
2-N-morpholinoethoxyethyl isobornyl thioether
2-N-morpholinoethoxyethyl 3,7-dimethyloctyl thioether
2-N-morpholinoethoxyethyl 3,7-dimethyloctyl ether
2-N-piperidinoethoxyethyl carvyl ether
2-N-piperidinoethoxyethyl carvyl thioether
2-N-piperidinoethoxyethyl isobornyl ether
2-N-piperidinoethoxyethyl isobornyl thioether
2-N-piperidinoethoxyethyl 3,7-dimethyloctyl thioether
2-N-piperidinoethoxyethyl 3,7-dimethyloctyl ether
2-N-pyrrolidinoethoxyethyl carvyl thioether
2-N-pyrrolidinoethoxyethyl carvyl ether
2-N-pyrrolidinoethoxyethyl isobornyl ether
2-N-pyrrolidinoethoxyethyl isobornyl thioether
2-N-pyrrolidinoethoxyethyl 3,7-dimethyloctyl thioether
2-N-pyrrolidinoethoxyethyl 3,7-dimethyloctyl ether
2-N-morpholinoethyl carvyl ether
2-N-morpholinoethyl carvyl thioether
2-N-morpholinoethyl isobornyl thioether
2-N-morpholinoethyl isobornyl ether
2-N-morpholinoethyl 3,7-dimethyloctyl thioether
2-N-morpholinoethyl 3,7-dimethyloctyl ether
2-N-piperidinoethyl carvyl ether
2-N-piperidinoethyl carvyl thioether
2-N-piperidinoethyl isobornyl ether
2-N-piperidinoethyl isobornyl thioether
2-N-piperidinoethyl 3,7-dimethyloctyl thioether
2-N-piperidinoethyl 3,7-dimethyloctyl ether
2-N-pyrrolidinoethyl carvyl ether
2-N-pyrrolidinoethyl carvyl thioether
2-N-pyrrolidinoethyl isobornyl thioether
2-N-pyrrolidinoethyl isobornyl ether
2-N-pyrrolidinoethyl 3,7-dimethyloctyl thioether
2-N-pyrrolidinoethyl 3,7-dimethyloctyl ether One aspect of the present invention provides a class of compositions comprising a phytocidal amount of a compound falling within the scope of Formula I and an inert carrier or diluent conventionally used in the art.

The amount of such compound employed in the phytocidal compositions of this invention can vary widely between about 0.1 to about 90 weight percent basis the weight of the composition and will depend upon the intended end use. Usually, the compositions contain between about 0.1 to about 10 weight percent of one or more of the compounds hereinbefore described, and the compound is usually in intimate mixture with the carrier. When it is desired to use a phytocidal composition directly (i.e. without further dilution), the amount of the compound will usually vary from between about 0.1 to about 0.5 weight percent. When it is desired to formulate a concentrated composition, i.e. one suitable for dilution prior to end use, the compounds will usually be present in the composition in an amount of from 0.5 to about 90 weight percent.

From a practical standpoint, compositions containing from 0.5 to 10 weight percent of compound can be advantageously employed for general end use dilution.

The carrier employed can be any carrier conventionally used in phytocidal formulations with the proviso that the carrier should be inert (i.e. it should be incapable of undergoing a chemical reaction with the compound used). The carrier should also be one that will not be harmful to the environment, other than the undesired plants, in which it is employed. The carrier can be any one of a variety of organic and inorganic liquid, solid or semi-solid carriers or carrier formulations conventionally used in phytocidal products and can be a mixture of such carriers.

Examples of organic liquid carriers include liquid aliphatic hydrocarbons such as pentane, hexane, heptane, nonane, decane and their analogs, as well as liquid aromatic hydrocarbons. Examples of other liquid hydrocarbons which are widely used for economic reasons include oils produced by the distillation of coal and the distillation of various types and grades of petrochemical stocks. Petroleum oils which are especially useful and economical include kerosene oils (e.g. oils composed of hydrocarbon mixtures of lower molecular weight and which have from ten to sixteen carbon atoms), which are obtained by fractional distillation of petroleum at between 360°F. and 510°F., and which usually have a flash point between 150°F. and 185°F.

Other petroleum oils include those generally referred to in the art as agricultural spray oils which are light and medium spray oils consisting of the middle fractions in the distillation of petroleum, and have a viscosity in the range of from 40–85 sec. Saybolt at 100°F. and are only slightly volatile. These oils are usually highly refined and contain only minute amounts of unsaturated compounds as measured by standard sulfonation tests. The customary sulfonation range of such oils is between 90 percent and 94 percent of unsulfonatable residue. These oils are paraffin oils and can be emulsified with water and an emulsifier and diluted to lower concentrations and used as sprays. Tall oils obtained from sulfate digestion of wood pulp, like paraffin oils, can also be employed.

In addition to the above-mentioned liquid hydrocarbons and often employed in conjunction therewith, the carrier can contain conventional emulsifying agents (e.g. a non-ionic surfactant such as an ethylene oxide condensate of octyl phenol or an anionic surfactant such as an alkali metal salt of an alkyl-benzene-sulfonic acid). Such emulsifiers are used to permit the composition to be dispersed in and diluted with water for end use applications.

When paraffin oils are employed as carriers in the phytocidal compositions of this invention, they are usually used in conjunction with an emulsifier, the mixture being diluted with water immediately prior to the end-use application. By way of example, a compound falling within the scope of Formula I can be dissolved in paraffin oil containing an emulsifier and such composition subsequently diluted with water to form an oil-water emulsion. Such emulsion, when atomized and sprayed on soils containing planted crop seeds and undesirable volunteer weed seeds prior to the emergence of the seeds, will prevent the normal emergence of the undesirable volunteer weeds without damage or injury or prevention of the normal emergence of crop seeds from the soil after germination. On the other hand, when compositions falling within the scope of this invention are so dissolved, emulsified and sprayed on fields containing growing crops and weeds, the weeds will be killed or damaged to the exclusion of substantial adverse effects upon the growing crop plants. Other suitable paraffin oils, particularly those used with emulsions, are referred to in the art as heavy paraffin oils and usually have a viscosity greater than 85 sec. Saybolt at 100°F.

Other advantageous organic liquid carriers can include liquid terpene hydrocarbons and terpene alcohols (e.g. alphapinene, dipentene, terpineol, and the like).

Still other liquid carriers include organic solvents such as aliphatic and aromatic alcohols, esters, aldehydes and ketones. Aliphatic monohydric alcohols include methyl, ethyl, n-propyl, isopropyl, n-butyl, sec-butyl, and t-butyl alcohols. Suitable dihydric alcohols include glycols such as ethylene and propylene glycol and the pinacols (alcohols having the empirical formula $C_6H_{12}(OH)_2$).

Suitable polyhydroxy alcohols include glycerol, arabitol, erythritol, sorbitol and the like. Suitable cyclic alcohols include cyclo-pentyl and cyclo-hexyl alcohols.

Conventional aromatic and aliphatic esters, aldehydes and ketones may be employed and are usually used in combination with the above-mentioned alcohols. Still other liquid carriers including high-boiling petroleum products such as mineral oil and higher alcohols (sometimes referred to as "liquid waxes") such as cetyl alcohol, may also be employed.

Solid carriers which may be used in the compositions of this invention include finely divided inorganic solid materials. Suitable finely divided solid inorganic carriers include siliceous minerals such as clays (e.g. bentonite, attapulgite, fuller's earth, diatomaceous earth, kaolin, mica, talc, finely divided quartz, etc.) as well as synthetically-prepared siliceous materials such as silica aerogels and precipitated and fume silicas.

Examples of finely-divided solid organic materials include starch, flour, sugar, sawdust, casein, gelatin, and the like.

Examples of semi-solid carriers include petroleum jelly, lanolin and the like, and mixtures of liquid and solid carriers which provide semi-solid carrier products.

Compositions of this invention can be employed per se, can be diluted with suitable liquids or can be applied to the soil in the form of a dust and mixed with the soil by conventional agricultural cultivation techniques.

The present invention provides a method of selectively controlling undesirable plant growth which comprises applying to an environment to which a crop will be or has been planted an amount of a composition, falling within the scope of the selectively phytocidal compositions hereinbefore described, effective for substantially inhibiting the growth of pest weeds, said amount not being substantially in excess of 10 lbs. per acre.

The amount of phytocidal composition of this invention which may be applied to an environment, preferably a soil environment (although sand or water may sometimes constitute the environment) will vary considerably depending upon the particular crop planted and the kind of pest plants indigenous to the particular environment, and whether the composition is to be used pre-emergently or post-emergently.

Generally, the amount will not be substantially in excess of 10 lbs. of phytocidal composition per acre of soil. If more than 10 lbs. of phytocidal composition per acre are applied per acre of soil, certain crops may be damaged. If less than 2.5 lbs. of phytocidal composition are applied per acre of soil, certain weeds may not be killed or sufficiently damaged, thus lessening the effectiveness of the treatment.

The compositions can be employed both pre-emergently and post-emergently in an amount of from about 2.5 to about 10 lbs. of compound per acre of soil and are usually effective in killing or inhibiting the growth of common pest weeds wihout damage to crop plants. Although in the case of certain plants, such as corn and oats, more than 10 lbs. per acre of the compositions of this invention can be applied without adversely affecting the plants, other plants such as cotton, although not killed, may exhibit some growth inhibition.

The term "pre-emergent herbicide" as used herein is intended to mean and to refer to compositions which when applied to soils containing pest weed seeds and crop seeds prior to the emergence of the crops and weeds, will selectively prevent or impair the germination and/or growth of the pest weeds without substantial injury to the germination and/or growth of the crop seeds.

The term "post-emergent herbicide" as used herein is intended to mean and to refer to compositions which when applied after the emergence of crop plants and a substantial percentage of pest weeds will selectively kill or seriously injure the pest weeds without substantial injury to the crop plants.

Undesirable plants can be eliminated by contacting a portion of the plant with a liquid, solid or semi-solid composition of this invention. The contact may be accomplished directly (e.g. by atomizing the composition into the air as a liquid or as a dust so that the material will fall on the plants). Alternatively, the contact may be indirectly effected contacting the soil with a composition of this invention prior to the emergence of undesirable plants.

As will be evident from the examples, the compositions of this invention when applied at the appropriate levels are selective pre-emergent and post-emergent herbicides and when used pre-emergently will permit the substantially uninihibited growth of corn, oats, rice, soybeans, carrot and cotton while killing or severely damaging mustard, yellow foxtail, barnyard grass, crabgrass, millet, pigweed, buckwheat, coffeeweed and morning glory. When used post-emergently, that is, to fields in which valuable crops such as corn, oats, rice, soybeans, carrot and cotton are growing, the compositions of this invention will kill or damage mustard, yellow foxtail, barnyard grass, crabgrass, millet, pigweed, buckwheat, coffeeweed, morning glory without substantial damage or inhibition of the growth of the aforementioned crop plants.

The following examples are intended to illustrate the invention but not to limit the scope thereof, parts and percentages being by weight unless otherwise specified.

EXAMPLE 1

Six separate acetone solutions were prepared, each containing 2.5 weight per cent of one of the following compounds:

2-N-morpholinoethoxyethyl carvyl ether
2-N-morpholinoethyl 3,7-dimethyloctyl ether
2-N-morpholinoethyl carvyl ether
2-N-morpholinoethyl isobornyl ether
2-N-morpholinoethoxyethyl isobornyl ether
2-N-morpholinoethoxyethyl 3,7-dimethyloctyl ether The six separate solutions were tested for selective post-emergent herbicidal activity using the following standard agricultural screening procedure for post-emergent herbicides.

Three groups of individual disposable 4 inch square by 6 inch deep containers were filled with standard soil and the containers of each group seeded according to growth requirement schedules containing, respectively, newly-planted corn, oats, rice soybeans, cotton, mustard, yellow foxtail, barnyard grass, crabgrass, millet, pigweed, buckwheat, coffeeweed, and morning glory. When the crop plants (e.g. corn, rice, oats, soybeans and cotton) and weed plants (e.g. mustard, yellow foxtail, barnyard grass, crabgrass, millet, pigweed, buckwheat, coffeeweed and morning glory) had reached a growth development characterized by the first true leaf stage, they were placed in carrying trays and treated.

Each of the first group of containers was sprayed with an amount of acetone solution to provide an amount of ether application equivalent to 10 lbs. per acre of soil.

Each of the second group of containers was sprayed with an amount of acetone solution to provide an amount of ether application equivalent to 5 lbs. per acre of soil.

Each of the third group of containers was sprayed with an amount of acetone solution to provide an amount of ether application equivalent to 2.5 lbs. per acre of soil.

After treatment, the plants were observed daily, final observation being made 14 days after treatment. Such observation included all abnormal physiological responses, such as stem bending, petiole curvature, epinasty, hyponasty, retardation, stimulation, root development, necrosis, and related growth regulant characteristics.

In the group of containers which received the solutions in an amount equivalent to 10 lbs. per acre, all pest weeds (e.g. mustard, yellow foxtail, barnyard grass, crabgrass, millet, pigweed, buckwheat, coffeeweed and morning glory) were either killed or severely damaged to such an extent that the plants usually did not recover. On the other hand, the corn, rice, and oats showed only a slight growth retardation from which the plants recovered.

In the group of containers to which the solutions were applied to the plants in amount equivalent to 5 lbs. and 2.5 lbs. per acre, the mustard and morning glory plants were killed, whereas the yellow foxtail, barnyard grass crabgrass, millet, pigweed, coffeeweed and buckwheat were severely damaged; the plants usually did not recover. The corn and oats showed only a slight growth retardation, less than when 10 lbs. per acre equivalent of the ether was applied, but the plants recovered. Cotton and soybeans showed a slight growth retardation with the plants recovering. There was no injury to crop or weed plants in the untreated controls.

EXAMPLE 2

The procedure of Example 1 is repeated, except that the plants are treated with corresponding thioether analogs in place of the ethers used in Example 1. The selective post-emergent herbicidal activity is substantially the same as or slightly greater than that exhibited in Example 1.

EXAMPLE 3

When the procedure of Example 1 is repeated using corresponding 2-N-piperidinoethoxyethyl and 2-N-piperidinoethyl ethers in place of the 2-N-morpholinoethoxyethyl and 2-N-morpholinoethyl ethers of Example 1, the selective post-emergent herbicidal activity obtained is substantially the same as that exhibited in Example 1.

EXAMPLE 4

When the procedure of Example 2 is repeated using corresponding 2-N-piperidinoethoxyethyl and 2-N-piperidinoethyl thioethers in place of the 2-N-morpholinoethoxyethyl and 2-N-morpholinoethyl thioethers of Example 2, the selective post-emergent herbicidal activity obtained is substantially the same as that exhibited in Example 2.

EXAMPLE 5

When the procedure of Example 1 is repeated using corresponding 2-N-pyrrolidinoethoxyethyl and 2-N-pyrrolidinoethyl ethers in place of the 2-N-morpholinoethyoxyethyl and 2-N-morpholinoethyl ethers of Example 1, selective post-emergent herbicidal activity obtained is substantially the same as that exhibited in Example 1.

EXAMPLE 6

When the procedure of Example 2 is repeated using corresponding 2-N-pyrrolidinoethoxyethyl and 2-N-pyrrolidinoethyl thioethers in place of the 2-N-morpholinoethoxyethyl and 2-N-morpholinoethyl thioethers of Example 2, the selective post-emergent herbicidal activity obtained is substantially the same as that exhibited in Example 2.

EXAMPLE 7

Six separate test solutions were prepared, each containing 2.5 weight per cent of one of the six compounds of Example 1. In order to test pre-emergent and soil-incorporated activity, each solution was applied in sufficient volume to assure thorough and uniform coverage at an 8 lb. per acre rate.

Each of the separate solutions were tested as pre-emergents by application of the solution to the soil surface of seeded flats. Care was taken to see that no seedlings had emerged from the soil before application.

The solutions were tested for soil-incorporated activity by application of the solution to exposed seeds before covering with fresh untreated soil.

Evaluation of the herbicidal performance of the solutions was made by comparison of plant stands in the treatment with those in untreated controls and those treated with a known standard, i.e. 3', 4'-dichloropropionanilide. Each solution was tested for pre-emergent and soil-incorporated activity on seeds of: ryegrass, soybean, coffeeweed, rice, carrot, corn, millet, cotton and barnyard grass.

All the solutions tested were toxic to barnyard grass and millet with a 95 to 100 % kill when applied pre-emergently or soil-incorporated. The standard propanil was toxic to barnyard grass and millet and moderately injurious to cotton and coffeeweed. The solutions tested were selective in favor of corn, rice, carrot, cotton and soybean, there being no injury observed on these crop plants. There was no injury to the crop or weed plants in the untreated controls.

EXAMPLE 8

The procedure of Example 7 is repeated except the seeds are treated with corresponding thioether analogs in place of the ethers used in Example 7. The selective pre-emergent and soil-incorporated herbicidal activity obtained is substantially the same as that exhibited in Example 7.

EXAMPLE 9

When the procedure of Example 7 is repeated using corresponding 2-N-piperidinoethoxyethyl and 2-N-peridinoethyl ethers in place of the 2-N-morpholinoethoxyethyl and 2-N-morpholinoethyl ethers in Example 7, the selective pre-emergent and soil-incorporated herbicidal activity obtained is substantially the same as that exhibited in Example 7.

EXAMPLE 10

When the procedure of Example 8 is repeated using corresponding 2-N-piperidinoethoxyethyl and 2-N-piperidinoethyl thioethers in place of the 2-N-morpholinoethoxyethyl and 2-N-morpholinoethyl thioethers of Example 8, the selective pre-emergent and soil-incorporated herbicidal activity obtained is substantially the same as that exhibited in Example 8.

EXAMPLE 11

When the procedure of Example 7 is repeated using corresponding 2-N-pyrrolidinoethoxyethyl and 2-N-pyrrolidinoethyl ethers in place of the 2-N-morpholinoethyl ethers in Example 7, the selective pre-emergent and soil-incorporated herbicidal activity obtained is substantially the same as that exhibited in Example 7.

EXAMPLE 12

When the procedure of Example 8 is repeated using corresponding 2-N-pyrrolidinoethoxyethyl and 2-N-pyrrolidinoethyl thioethers in place of the 2-N-morpholinoethoxyethyl and 2-N-morpholinoethyl thioethers of Example 8, the selective pre-emergent and soil-incorporated herbicidal activity obtained is substantially the same as that exhibited in Example 8.

EXAMPLE 13

Eight (8) separate acetone solutions were prepared, each containing 2.5 weight per cent of one of the following compounds:

2-N-morpholinoethoxyethyl terpinyl ether
2-N-morpholinoethoxyethyl geranyl ether
2-N-morpholinoethyl terpinyl ether
2-N-morpholinoethyl pinocarvyl ether
2-N-morpholinoethyl geranyl ether
2-N-morpholinoethyl linalyl ether
2-N-morpholinoethoxyethyl linalyl ether
2-N-morpholinoethoxyethyl pinocarvyl ether The eight separate solutions were tested for general post-emergent herbicidal activity using the following standard agricultural screening procedure for post-emergent herbicides.

Three groups of individual disposable 4 inch square by 6 inch deep containers were filled with standard soil and the containers of each group seeded according to growth requirement schedules containing, respectively, newly-planted corn, oats, rice, soybeans, cotton, mustard, yellow foxtail, barnyard grass, crabgrass, millet, pigweed buckwheat, coffeeweed, and morning glory. When the crop plants (e.g. corn, rice, oats, soybeans and cotton) and weed plants (e.g. mustard, yellow foxtail, barnyard grass, crabgrass, millet, pigweed, buckwheat, coffeeweed and morning glory) had reached a growth development characterized by the first true leaf stage, they were placed in carrying trays and treated.

Each of the first group of containers was sprayed with an amount of acetone solution to provide an amount of ether application equivalent to 10 lbs. per acre of soil.

Each of the second group of containers was sprayed with an amount of acetone solution to provide an amount of ether application equivalent to 5 lbs. per acre of soil.

Each of the third group of containers was sprayed with an amount of acetone solution to provide an amount of ether application equivalent to 2.5 lbs. per acre of soil.

After treatment, the plants were observed daily, final observation being made 14 days after treament. Such observation included all abnormal physiological responses, such as stem bending, petiole curvature, epinasty, hyponasty, retardation, stimulation, root development, necrosis, and related growth regulant characteristics.

In the group of containers which received the solutions in an amount equivalent to 10 lbs. per acre, all pest weeds and crop plants were either killed or severely damaged to such an extent that the plants usually did not recover.

In the group of containers to which the solutions were applied to the plants in amounts equivalent to 5 lbs. and 2.5 lbs. per acre, the mustard, morning glory, yellow foxtail, barnyard grass, crabgrass, millet, pigweed, coffeeweed and buckwheat were killed. The corn and oats were severely damaged; the plants usually did not recover. Cotton and soybeans showed growth retardation, but the plants recovered. There was no injury to crop or weed plants in the untreated controls.

As will be evident from the foregoing examples, some of the compositions of this invention are selective herbicides when used in concentrations of about 10 lbs. per acre or less, and some of the compositions of this invention are general herbicides when used in concentrations of about 10 lbs. per acre or less. Certain of the compositions exhibiting general herbicidal activity also exhibit selective herbicidal activity when used in concentrations of about 5 lbs. per acre or less.

What is claimed is:

1. A process for controlling undesirable plant growth which comprises applying to the plant environment an amount effective for substantially inhibiting the growth of undesirable plants, said amount being not in excess of about ten pounds per acre, of a heterocyclic tertiary aminoalkyl ether of the formula:

where Y is a $C_{8-12}$ hydrocarbon radical;
 "$n$" is an integer of 1 to 3;
 R is lower alkylene; and
  is morpholino.

2. The process of claim 1 wherein said ether is 2-N-morpholinoethyl 3,7-dimethyloctyl ether.

3. The process of claim 1 wherein said ether is 2-N-morpholinoethoxyethyl 3,7-dimethyloctyl ether.

4. The process of claim 1 wherein said ether is 2-N-morpholinoethoxyethyl carvyl ether.

5. The process of claim 1 wherein said ether is 2-N-morpholinoethoxyethyl isobornyl ether.

6. The process according to claim 1 wherein Y is selected from the groups consisting of geranyl, terpinyl, linalyl, carvyl, pinocaruyl, isobornyl or 3,7-dimethyloctyl.

* * * * *

UNITED STATES PATENT OFFICE
CERTIFICATE OF CORRECTION

PATENT NO. : 3,871,863
DATED : March 18, 1975
INVENTOR(S) : Kenneth P. Dorschner and Carl Bordenca It is certified that error appears in the above-identified patent and that said Letters Patent are hereby corrected as shown below:

Column 2, line 58, "methyl" should read --menthyl--.

Column 12, Example 11, line 23, after the phrase "in place of the" and before "2-N-" add the phrase --2-N-morpholinoethoxy-ethyl and--.

Column 14, Claim 1, please insert the following formula after line 16.

$$Y - (X - R)_n - N\bigcirc$$

Column 14, Claim 1, line 20, before the phrase "is morpholino" insert -- $N\bigcirc$ --.

Column 14, Claim 6, line 31, "pinocaruyl," should read --pinocarvyl--.

Signed and sealed this 27th day of May 1975.

(SEAL)
Attest:

RUTH C. MASON
Attesting Officer

C. MARSHALL DANN
Commissioner of Patents
and Trademarks